Jan. 7, 1936.     B. W. DAVID     2,027,224
INDICATING DEVICE FOR ARC WELDING
Filed March 13, 1934     2 Sheets-Sheet 1

INVENTOR
BRUCE W. DAVID.
BY Milburn and Milburn
ATTORNEYS.

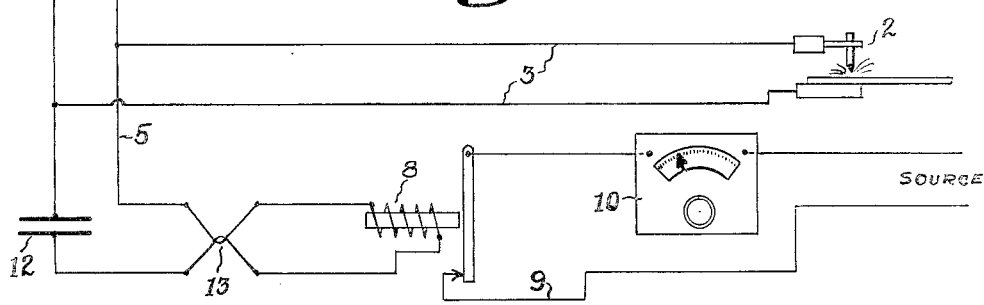
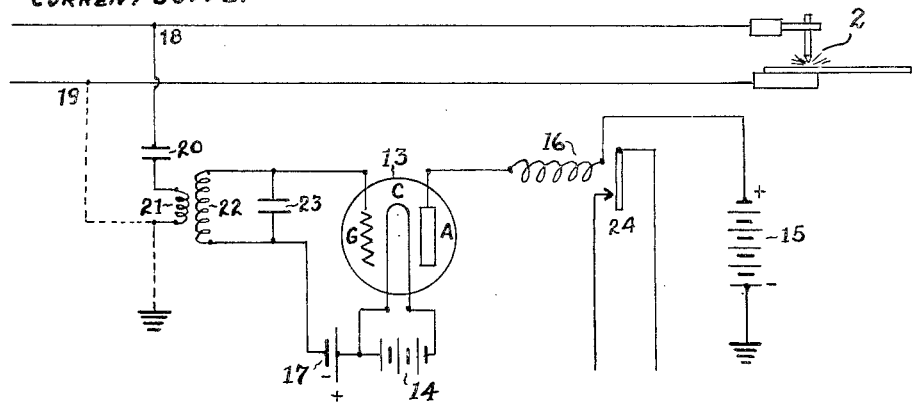

Patented Jan. 7, 1936

2,027,224

UNITED STATES PATENT OFFICE 2,027,224

INDICATING DEVICE FOR ARC WELDING

Bruce W. David, Cleveland Heights, Ohio, assignor to Robert E. Kinkead, Shaker Heights, Ohio Application March 13, 1934, Serial No. 715,316

21 Claims. (Cl. 219—8)

This invention relates to the art of arc-welding.

In this art, the welding operations are often performed at points comparatively remote from the location of the supervisor, as for instance in ship-building, and it is therefore practically impossible for the supervisor to keep close watch over the workmen so as to know whether they are continuously at work.

Because of these circumstances, it is possible that the workmen may take advantage of their employer by loitering since the supervisor has no means of determining exactly how much time has actually been spent at work.

Obviously it would not solve the problem to employ a tell-tale device to indicate to the supervisor that the current supply is being employed by the workman, for the workman could close the operating circuit by placing the electrode in idle engagement upon the work, or upon a suitably contrived resistor which would sufficiently simulate the conditions of actual welding, as far as voltage and current are concerned.

It is the object of the present invention to provide a device which will indicate, signal, or record the fact that the arc-welding device is being operated in a normal or correct manner and furthermore to provide a device the functioning of which depends upon a property or characteristic of a normally operated welding arc, that cannot easily be falsely simulated by the operator.

As a means of accomplishing this object, I utilize the comparatively rapid pulsations of current or voltage that result from the transfer of droplets of metal across the welding arc to cause the operation of an indicating, signalling, or recording device, in such a manner that indications are produced only when the arc-welding device is operated in a normal manner.

Thus, with my present system, no indication will be produced when the arc-welding circuit is open, neither will indications be produced by the flow of current in the arc-welding circuit unless this current flow is characterized by the superposed pulsations resulting from actual arc-welding in the normal manner. Such indication or absence of indication may be made readily accessible to the supervisor and will afford him definite and reliable data as to the operation of the arc-welding device.

Another feature of the device herein disclosed is that it is simple in construction, reliable in operation, convenient to install, and can be manufactured at a reasonable cost.

Other objects will appear from the following description and claims when considered together with the accompanying drawings.

Referring to the drawings, Fig. 1 represents diagrammatically one form of system embodying my invention;

Fig. 3 is a diagrammatic illustration of still another form of system embodying my invention; and Fig. 4 is a diagrammatic illustration of a still further form of system embodying my invention.

All of these several forms of systems are electrical and it is contemplated that my invention may be embodied in a system in which the arc-welding device is operated by either direct current or alternating current, as will more fully appear.

Figure 1:
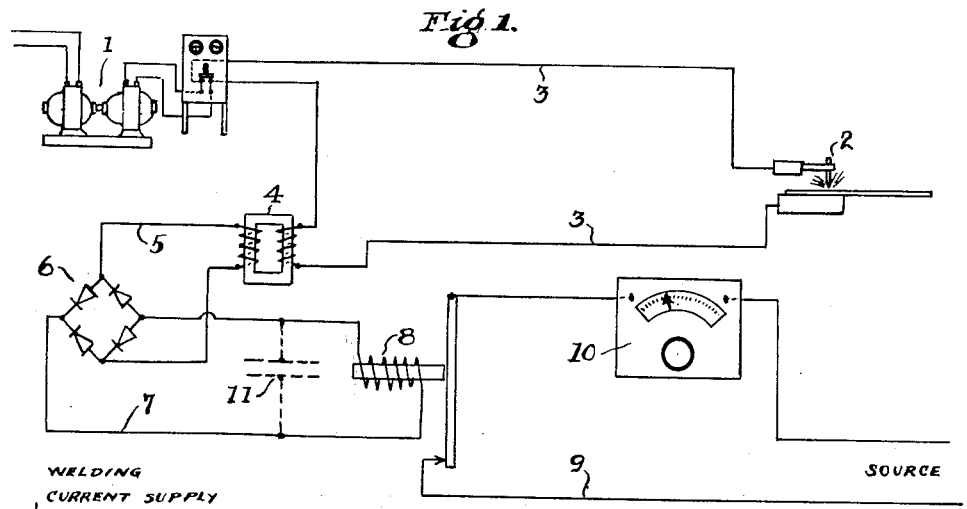

Referring first to Fig. 1, there is indicated a welding current generator 1, (D. C.), for supplying direct current to the arc-welding device 2 included in the electric circuit 3 which connects with the primary side of the transformer 4. The secondary side of the transformer is in the electric circuit 5 which is connected to the rectifier 6 which is connected at its outlet side to the circuit 7. The coil of relay 8 is also included within the circuit 7, this relay being associated with the auxiliary circuit 9 within which there is included the electrical indicating device 10 and a source of voltage.

To explain the system in Fig. 1, normal operation of the arc-welding device will be accompanied by transfer of the molten metal from the welding electrode, each drop of metal forming a partial short circuit or decrease in the arc resistance, which results in an increased pulse of current and corresponding drop in voltage. Such normal operation of the arc-welding device develops an alternating current superposed upon the direct current and having an erratic frequency and amplitude characteristic of the arc-welding operation as just explained.

Further referring to Fig. 1, the transformer permits only the alterating current characteristic of normal arc-welding operation to pass and this alternating current is converted by the rectifier into uni-directional flow of current. Each pulse of current flowing through the relay 8 will, if strong enough, cause the armature of the relay to be attracted or will contribute a portion of the energy required to attract the armature or hold it in the closed position. Chattering of the relay armature is prevented and the storing up and smoothing out of the separate current impulses is obtained by means of a condenser 11 or by means of a low resistance damper coil, washer, or tube on the relay itself. Thus, the rapid sequence of current pulses incident to normal arc-welding will cause the relay armature to be held in the closed position and consequently the auxiliary circuit 9 is closed, thus causing the operation of the indicating device 10.

The rectifier 6 may be of any form. A vacuum tube may be employed in this connection. An arrangement in which a vacuum tube is employed is illustrated in Fig. 4 of the accompanying drawing.

The indicating means 10 may be in the form of an electric light or an electric bell or buzzer, or it may be in the form of a clock or a recording device capable of producing a permanent and progressive record as a "graph" bearing all essential data as to duration of period or periods of normal operation of the arc-welding device.

Figure 2:
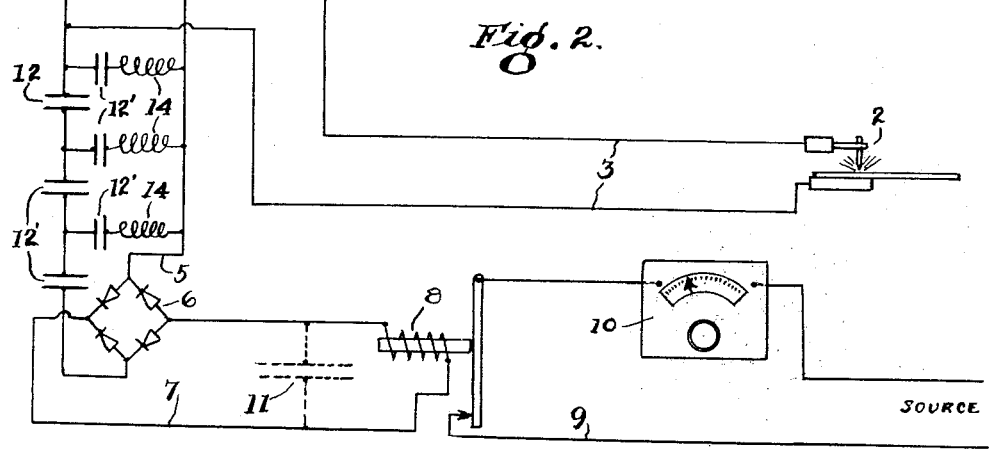
Fig. 2 illustrates diagrammatically another form of system embodying my invention.

Referring now to Fig. 2, it will be explained that in this modified device, the condenser 12 is substituted for the transformer 4 and this device is otherwise the same in principle as the device shown in Fig. 1, the condenser in Fig. 2 performing the function of permitting the flow of the alternating current impulses while blocking the flow of the direct power current.

Referring to Fig. 3, this modified device is the same in principle as that shown in Fig. 2 except that a thermo-couple 13 is employed in lieu of the rectifier, the function performed thereby being the same.

The rectifier is used to facilitate the operation of the relay but a suitable relay may be used to operate from the unrectified alternating pulsations.

All of the above three systems, as thus far described, are presumed to employ direct current for the arc-welding device, but it is to be understood that this same device in its essential form can be operated in connection with alternating current for the arc-welding device, this being accomplished by inserting a filter at some point in the device, for instance between the condenser 12 and the rectifier 6 (Fig. 2). Likewise, a filter can be adopted also in the form in Fig. 3. In this way, current of the power-supply frequency may be cut out and only the current of the characteristic arc-welding frequency permitted to pass on to the rectifier or thermo-couple. The condenser 12 may become a part of this filter which includes also choke coils 14 and other condensers 12'. Thus, there is precluded any possibility of the relay being actuated by the frequency of the alternating current power supply and consequently the operation of the relay will be in accordance with the pulses or rapid alternations produced by the arc-welding device when operated in a normal welding manner. While the form of device in Fig. 1 is designed for direct current, those in Figs. 2 and 3 may be employed with either direct or alternating current, with the inclusion of the filter as above described.

Referring to Fig. 4, 13 is a vacuum tube having the essential elements, cathode C, anode A, and grid G. The cathode is heated by a battery 14, and anode current is supplied by a battery 15 through relay coil 16.

In the non-operating condition, anode current is biased to zero or below the actuating value of relay 16 by means of a battery 17 which puts a negative potential on grid G.

The vacuum tube 13 is coupled to the welding circuit at points 18—19 through a condenser 20 and the transformer primary 21. The transformer secondary 22 may be paralleled or tuned by a condenser 23.

The transformer 21, 22 and the associated condensers 20 and 23 may be so constructed and proportioned that certain low frequencies, say 60 cycles or 500 cycles, are practically precluded from being transmitted to the grid G of the vacuum tube. Thus, this device may be connected to an A. C. welding circuit 18, 19. In this case, the plate or anode current to the tube through the relay coil 16 will remain zero until the welding arc is started. The high frequencies (high audio and radio frequencies) which are set up by the arc and the spluttering of the metal, will be impressed upon the grid of the tube; and by raising the potential of the grid, anode current will flow through the relay coil, thus causing the contact 24 to be closed in the signal circuit for the period that the arc is operating (depending on adjustments, etc.).

For operation on a D. C. welder, the transformer 21—22 may have an iron core if desired. It may be designed to limit cut off of frequencies at any desired point to exclude commutator ripple, etc. Other forms of grid coupling may be used, the essential feature being that the tube 13 acts as a rectifier, detector, or trigger valve. This might be done by using a two element tube or "diode".

The essential operation is that the rectified current be zero or small (below operating current of relay) when the arc is not operated and that it increase when the arc is started.

Many types of vacuum tubes may be used, some having more elements as in modern heater type or pentodes.

Instead of batteries for voltage supply, rectifiers and filters may be used or the bias for the grid may be obtained from a resistor as in modern radio practice.

The single tube shown embodies the essential features but in practical operation this "detector tube" may be preceded by one or more tubes which act as amplifiers of the impressed frequencies and also it may be followed by other tubes which act as amplifiers of the rectified frequency.

Thus, it will be seen that the indicating device will be operated only as long as the welding arc is functioning. If the welding electrode should lie idle, entirely off of the piece of work, or if the electrode should be placed across the work, in neither case would the relay be actuated and there would be no indication at the central station. If provided with a suitable indicator or recorder, the supervisor may thus observe at any time during the progress of welding or may obtain a complete record at the close of the working period, as to exactly when and how long any particular workman applied himself to the work of actual welding. Thus, the supervisor is enabled to readily ascertain the extent of any idle periods and may then proceed to determine the reason for the same. Such a device not only shows exactly how long a time is required to perform a given piece of work but it serves also to produce an improvement in the industriousness and quality of workmanship of the workmen whose actual working time is automatically and accurately indicated or recorded.

This device is of a comparatively simple nature and can be constructed at a correspondingly low cost. Furthermore, the electrical combination embodied in this invention may be regarded and assembled as a unit which can be readily installed as part of any arc-welding system for any particular work.

What I claim is:

1. In the art of arc-welding, the combination of an electric circuit including an arc-welding device and a source of current supply therefor, and means actuated only by the rapid pulsations of current or voltage caused by the transfer of molten metal from the welding electrode, for indicating when the arc-welding device is operated in a normal welding manner.

2. In the art of arc-welding, the combination of an electric circuit including an arc-welding device and a source of current supply therefor, an indicating device, and means actuated only by the rapid pulsations of current or voltage caused by the transfer of molten metal from the welding electrode for operating said indicating device, whereby said indicating device will be actuated only when the arc-welding device is operated in a normal welding manner.

3. In the art of arc-welding, the combination of an electric circuit including an arc-welding device and a source of current supply therefor, an indicating device, and relay-controlled means actuated only by the pulsations of current or voltage caused by the transfer of molten metal from the welding electrode for operating said indicating device, whereby said indicating device will be actuated only when the arc-welding device is operated in a normal welding manner.

4. In the art of arc-welding, the combination of an electric circuit including an arc-welding device, a source of direct current supply therefor, an indicating device, means whereby such indicating device is actuated by the pulsations of current or voltage caused by the transfer of molten metal from the welding electrode, and means for excluding from said actuating device all direct current from the source of current supply, whereby the indicating device will be actuated only when the arc-welding device is operated in a normal welding manner.

5. In the art of arc-welding, the combination of an electric circuit including an arc-welding device, a source of current supply therefor, an auxiliary electric circuit, relay means in said auxiliary circuit, indicating means adapted to be operated by said relay means, and means for causing the relay to be energized only by the pulsations of current or voltage caused by the transfer of molten metal from the welding electrode, whereby said relay and in turn said indicating means will be actuated only when the arc-welding device is operated in a normal welding manner.

6. In the art of arc-welding, the combination in an electric system, of an arc-welding device and a source of current supply therefor, an indicating device, means whereby said indicating device is actuated by pulsations of current or voltage, of a frequency characteristic of the transfer of molten metal from the welding electrode, and means whereby currents or voltages of other frequencies are prevented from actuating the indicating device, whereby the indicating device will be actuated only when the arc-welding device is operated in a normal welding manner.

7. In the art of arc-welding, the combination in an electric system, of an arc-welding device, a source of current supply therefor, an indicating device, means whereby said indicating device is actuated by pulsations of current or voltage, of a frequency characteristic of the transfer of molten metal from the welding electrode, and means whereby currents or voltages of other frequencies are prevented from actuating the indicating device, and means whereby said pulsations are rectified to uni-directional currents, whereby the indicating device will be actuated only when the arc-welding device is operated in a normal welding manner.

8. In the art of arc-welding, the combination in an electric system of an arc-welding device, a source of current supply therefor, an indicating device, means for selecting pulsations of current or voltage of a frequency characteristic of the transfer of molten metal from the welding electrode, and means whereby said pulsations are rectified to uni-directional current, said indicating device being adapted to be actuated by the uni-directional current, whereby the indicating device will be actuated only when the arc-welding device is operated in a normal welding manner.

9. In the art of arc-welding, the combination in an electric system, of an arc-welding device, a source of direct current supply therefor, an indicating device, means for selecting pulsations of current or voltage of a frequency characteristic of the transfer of molten metal from the welding electrode, and means for rectifying said pulsations to uni-directional current, said indicating device being adapted to be actuated by the uni-directional current, whereby the indicator will be actuated only when the arc-welding device is operated in a normal welding manner.

10. In the art of arc-welding, the combination in an electric system, of an arc-welding device, a source of direct current supply therefor, a transformer which blocks the flow of direct current into its secondary circuit but permits the transfer of pulsations of current or voltage of a frequency characteristic of the transfer of molten metal from the welding electrode, a rectifier for converting said pulsations into uni-directional current, a relay operable by the current from said rectifier, and an indicating device adapted to be actuated by said relay whereby said indicator will be actuated only when the arc-welding device is operated in a normal welding manner.

11. In the art of arc-welding, the combination in an electrical system of an arc-welding device, a source of direct current supply therefor, a condensor which blocks the flow of direct current but permits the flow of pulsations of current of a frequency characteristic of the transfer of molten metal from the welding electrode, a rectifier for converting said pulsations into uni-directional current, a relay operable by the current from said rectifier, and an indicating device adapted to be actuated by said relay whereby said indicator will be actuated only when the arc-welding device is operated in a normal welding manner.

12. In the art of arc-welding, the combination in an electrical system of an arc-welding device, a source of direct current supply therefor, a condensor which blocks the flow of direct current but permits the flow of pulsations of current of a frequency characteristic of the transfer of molten metal from the welding electrode, a thermo-couple for converting said pulsations into uni-directional current, a relay operable by the current from said thermo-couple, and an indicating device adapted to be actuated by said relay whereby said indicator will be actuated only when the arc-welding device is operated in a normal welding manner.

13. In the art of arc-welding, the combination in an electric system of an arc-welding device, a source of alternating current supply therefor, means adapted to select pulsations of current or voltage of a frequency characteristic of the transfer of molten metal from the welding electrode, and means whereby pulsations of currents or voltages of other frequencies are excluded, means for rectifying the permitted pulsations into unidirectional current, a relay adapted to be operated by said uni-directional current, and an indicating device adapted to be actuated by said relay when the arc-welding device is operated in a normal welding manner.

14. In an indicating system adapted for use in connection with arc-welding, the combination of indicating means, means for selecting pulsations of current or voltage of a frequency characteristic of the transfer of molten metal from the welding electrode, means for converting said pulsations into uni-directional current, and means controlled by said uni-directional current for actuating said indicating means.

15. The method of indicating whether an arc-welding device is operated normally for welding, consisting in obtaining from the arc-welding circuit pulsations of current or voltage having a frequency characteristic of the transfer of molten metal from the welding electrode, and employing said current or voltage to indicate when the arc-welding device is operated in a normal welding manner.

16. The method of indicating when an arc-welding device is operated normally for welding, consisting in separating from the power supply voltage or current the pulsations of current or voltage having a frequency characteristic of the transfer of molten metal from the arc-welding electrode, and employing said pulsations of current for voltage to indicate when the arc-welding device is operated in a normal welding manner.

17. The method of indicating when an arc-welding device is operated normally for welding, consisting in separating from the power supply voltage or current, the pulsations of current or voltage having a frequency characteristic of the transfer of molten metal from the arc-welding electrode, converting said pulsations into uni-directional current, and employing this uni-directional current to indicate when the arc-welding device is operated in a normal welding manner.

18. The method of indicating when an arc-welding device is operated normally for welding, consisting in separating from the power supply voltage or current, the pulsations of current or voltage having a frequency characteristic of the transfer of molten metal from the arc-welding electrode, converting said pulsations into uni-directional current and employing this uni-directional current through a relay circuit, to produce an indication only when the arc-welding device is operated in a normal welding manner.

19. In the art of arc-welding, the combination of an electric circuit including an arc-welding device and a source of current supply therefor, and means actuated only by the rapid pulsations which are superposed on the slower variation of current or voltage caused by variation in average arc length, for indicating when the arc-welding device is operated in a normal welding manner.

20. In the art of arc-welding, the combination in an electric system of an arc-welding device, a source of current supply therefor, an indicating device, means for selecting pulsations of current or voltage of a frequency caused by the transfer of molten metal from the welding electrode, and vacuum tube means whereby said pulsations are rectified to uni-directional current, said indicating device being adapted to be actuated by the uni-directional current, whereby the indicating device will be actuated only when the arc-welding device is operated in a normal welding manner.

21. In an indicating system adapted for use in connection with arc-welding, the combination of indicating means, means for selecting pulsations of current or voltage of a frequency caused by the transfer of molten metal from the welding electrode, vacuum tube means for converting said pulsations into uni-directional current, and means controlled by said uni-directional current for actuating said indicating means.

BRUCE W. DAVID.